United States Patent
Touchette et al.

(10) Patent No.: US 10,788,002 B2
(45) Date of Patent: Sep. 29, 2020

(54) SEALING STRUCTURE FOR GASEOUS FUEL

(71) Applicant: WESTPORT POWER INC., Vancouver (CA)

(72) Inventors: Alain M. J. Touchette, Vancouver (CA); Nisha S. Cyril, Richmond (CA)

(73) Assignee: WESTPORT POWER INC., Vancouver (CA)

( * ) Notice: Subject to any disclaimer, the term of this patent is extended or adjusted under 35 U.S.C. 154(b) by 474 days.

(21) Appl. No.: 15/537,126

(22) PCT Filed: Dec. 18, 2015

(86) PCT No.: PCT/CA2015/051348
§ 371 (c)(1),
(2) Date: Jun. 16, 2017

(87) PCT Pub. No.: WO2016/095054
PCT Pub. Date: Jun. 23, 2016

(65) Prior Publication Data
US 2017/0350357 A1    Dec. 7, 2017

(30) Foreign Application Priority Data
Dec. 18, 2014    (CA) ..................................... 2875512

(51) Int. Cl.
*F16L 19/025*    (2006.01)
*F02M 55/00*    (2006.01)
(Continued)

(52) U.S. Cl.
CPC ...... *F02M 55/004* (2013.01); *F02M 21/0218* (2013.01); *F02M 21/0248* (2013.01);
(Continued)

(58) Field of Classification Search
CPC ... F16L 19/0225; F16L 19/025; F16L 19/028; F02M 55/004; F02M 55/025
(Continued)

(56) References Cited

U.S. PATENT DOCUMENTS 2,316,711 A * 4/1943 Parker .................... F16L 19/04
285/334.5
2,470,508 A * 5/1949 Maky .................... F16L 19/045
285/332.4
(Continued)

FOREIGN PATENT DOCUMENTS

CA    2 416 569 A1    3/2002
CN    2175835 Y       8/1994
(Continued)

OTHER PUBLICATIONS

International Search Report and Written Opinion, dated Feb. 19, 2016, for International Application No. PCT/CA2015/051348, 9 pages.
(Continued)

*Primary Examiner* — Aaron M Dunwoody
(74) *Attorney, Agent, or Firm* — Seed IP Law Group LLP

(57) ABSTRACT

In metal-on-metal sealing structures, the sealing criteria employed for high pressure liquid fuel does not work when sealing gaseous fuels. A technique for sealing a gaseous fuel between gaseous fuel conduits in an internal combustion engine includes forming a contact band between two surfaces of a sealing structure between a first conduit and a second conduit. A width of the contact band is at least equal to the larger of a minimum contact pressure width where contact pressure is at least equal to a predetermined minimum contact pressure; and a minimum yield zone width where at least one of the two surfaces have plastically deformed.

20 Claims, 4 Drawing Sheets

(51) Int. Cl.
*F16L 41/08* (2006.01)
*F02M 21/02* (2006.01)
*F02M 55/02* (2006.01)
*F16L 19/02* (2006.01)

(52) U.S. Cl.
CPC ......... *F02M 55/025* (2013.01); *F16L 19/025* (2013.01); *F16L 19/0225* (2013.01); *F16L 41/08* (2013.01); *Y02T 10/32* (2013.01)

(58) Field of Classification Search
USPC ........................ 285/332.2, 334.5, 386, 382
See application file for complete search history.

(56) References Cited

U.S. PATENT DOCUMENTS

| | | | | |
|---|---|---|---|---|
| 4,881,763 A * | 11/1989 | Guido | ................ | B21K 1/16 |
| | | | | 285/382 |
| 5,143,410 A * | 9/1992 | Takikawa | ............ | F02M 55/005 |
| | | | | 285/197 |
| 5,261,705 A * | 11/1993 | Takahashi | ........... | F02M 55/005 |
| | | | | 285/114 |
| 5,489,127 A * | 2/1996 | Anglin | ................ | F16L 19/0225 |
| | | | | 285/328 |
| 5,529,349 A * | 6/1996 | Gibbs | ................ | F16L 19/02 |
| | | | | 285/332 |
| 5,997,050 A * | 12/1999 | Fleckenstein | ........ | F02M 55/005 |
| | | | | 285/148.19 |
| 6,045,162 A * | 4/2000 | Haibara | .............. | F02M 55/005 |
| | | | | 285/55 |
| 6,213,095 B1 | 4/2001 | Asada et al. | | |
| 6,595,558 B2 * | 7/2003 | Kusanagi | ............... | B21K 21/12 |
| | | | | 285/382 |
| 7,275,521 B2 | 10/2007 | Usui et al. | | |
| 7,735,473 B2 * | 6/2010 | Kato | ................ | F02M 55/005 |
| | | | | 123/468 |
| 8,186,724 B2 | 5/2012 | Kato et al. | | |
| 2002/0195819 A1 * | 12/2002 | Sagaser | ............... | F16L 19/0286 |
| | | | | 285/249 |
| 2003/0047945 A1 * | 3/2003 | Schroeder | ........... | F16L 19/0283 |
| | | | | 285/334.5 |
| 2004/0262921 A1 * | 12/2004 | Watanabe | ........... | F02M 55/005 |
| | | | | 285/354 |
| 2005/0284447 A1 | 12/2005 | Usui et al. | | |
| 2006/0284421 A1 | 12/2006 | Fonville et al. | | |
| 2007/0194567 A1 * | 8/2007 | Pliassounov | ........ | F16L 19/0225 |
| | | | | 285/334.5 |
| 2009/0139595 A1 * | 6/2009 | Kato | .................... | F02M 55/005 |
| | | | | 138/109 |
| 2010/0084856 A1 | 4/2010 | Wrobel et al. | | |
| 2010/0301601 A1 * | 12/2010 | Harvey | ............... | F02M 55/005 |
| | | | | 285/334.5 |
| 2011/0037256 A1 * | 2/2011 | Calnek | .................. | B60T 17/046 |
| | | | | 285/334.5 |
| 2011/0121563 A1 * | 5/2011 | Toyoshima | .......... | F02M 55/005 |
| | | | | 285/263 |
| 2012/0038142 A1 * | 2/2012 | Legrand | ............... | F02M 55/002 |
| | | | | 285/14 |
| 2016/0131285 A1 * | 5/2016 | Komiya | ................. | F16L 19/06 |
| | | | | 285/386 |
| 2016/0230725 A1 * | 8/2016 | Katsumata | ............ | F02M 55/02 |
| 2017/0260946 A1 * | 9/2017 | Suzuki | .................. | F02M 55/02 |

FOREIGN PATENT DOCUMENTS

| | | |
|---|---|---|
| CN | 1721688 A | 1/2006 |
| CN | 1880824 A | 12/2006 |
| CN | 1944996 A | 4/2007 |
| FR | 2 859 268 A1 | 3/2005 |
| GB | 2 021 720 A | 12/1979 |
| JP | 45-23208 Y1 | 9/1970 |
| JP | 56-34954 A | 4/1981 |
| JP | 2599651 B2 | 4/1997 |
| JP | 2003-278623 A | 10/2003 |
| JP | 2007-77807 A | 3/2007 |

OTHER PUBLICATIONS

Extended European Search Report, dated May 8, 2018, for European Application No. 15868796.2-1004, 6 pages.
Chinese Office Action, dated Sep. 25, 2018, for Chinese Application No. 201580076385.2, 7 pages (with machine generated English Translation).

\* cited by examiner

SEALING STRUCTURE FOR GASEOUS FUEL

FIELD OF THE INVENTION

The present application relates to a sealing structure for gaseous fuel, and more particularly for sealing a conduit with a gaseous fuel rail and a gaseous fuel injector in an internal combustion engine.

BACKGROUND OF THE INVENTION

Late cycle direct injection of gaseous fuel is a revolutionary technology that is reshaping the Diesel-cycle internal combustion engine industry. By beginning introduction of gaseous fuel late in the compression stroke, the torque and fuel economy associated with diesel fuelled engines can be matched, with the benefit of reducing both emissions and fuelling cost. There are fundamental differences between how the fuel systems of diesel fuelled and gaseous fuelled engines operate, since diesel fuel is an incompressible fluid and gaseous fuels are compressible fluids. Diesel fuel is a liquid and as an essentially incompressible fluid, it can be pressurized to extremely high levels with greater efficiency than gaseous fuels, because it takes more energy to increase the pressure of a compressible fluid to the same high levels. High injection pressures for diesel help to atomize the fuel as it is injected into combustion chambers, and to increase turbulence that aids mixing of the fuel with the intake charge. Unlike diesel fuel, gaseous fuel does not require atomization, and while there are other factors which influence the choice of injection pressure, with known gaseous fuelled engines that inject the fuel directly into the combustion chamber, injection pressure has mainly been chosen by the pressure needed to overcome in-cylinder pressure at the time of injection and to be able to introduce enough fuel in the time available at full load to maintain power. As a practical example, it is not uncommon for a diesel fuel injection pressure to be around 3000 bar in modern day diesel engines, whereas gaseous fuel injection pressure for direct injection has typically been around 300 bar, an order of magnitude of difference.

There are different technical challenges when sealing fuel conduits between fuel rails and fuel injectors depending on whether the fuel is a liquid fuel or a gaseous fuel. As noted already, for liquid and gaseous fuels the respective injection pressures can be an order of magnitude different, and characteristic properties of liquid fuels are fundamentally different than gaseous fuels. Liquid particles have relatively very low potential energy, are somewhat attracted to each other and are very close together (but not locked in place), whereas gas particles have very high potential energy, have very weak attraction for each other and are extremely far apart. Liquid particles can vibrate and rotate with respect to each other, whereas gas particles can vibrate, rotate and translate with respect to each other. For at least these reasons different solutions have been employed for sealing fuel conduits between fuel rails and fuel injectors for gaseous fuels compared to liquid fuels.

Prior art gas sealing structures typically included an elastomer O-ring as a sealing member, arranged as either a radial seal or a face seal between opposing metal components. One such sealing structure was employed between a gaseous fuel rail and a fuel line branching from the fuel rail to a fuel injector. The O-ring sealing member was made of a semi-permeable and compressible material, such as an elastomer or rubber material, that is deformable to fill the asperities between the fuel rail and the fuel line, when put under compression. This prior art sealing structure was reliable and durable under both static and cyclical pressure conditions, up to pressures at least in the 300 bar range. Engines configured with this sealing apparatus operated normally for extended periods of time without any detected leakage. However, a failure mode appeared under certain extreme operating conditions that damaged the O-ring sealing member. If the gaseous fuel molecules are small enough to permeate the O-ring sealing member after being expose to high pressure gaseous fuel for extended periods of time, gas molecules can permeate into the sealing member. The longer the sealing member is exposed to high pressure gaseous fuel, the greater both the amount and depth of gaseous fuel molecule penetration. During a gaseous fuel depressurization event, when the pressure on the high pressure side of the sealing member is relieved, gaseous fuel molecules within the sealing member experience a pressure differential that causes them to rapidly evacuate the sealing member. When operating the internal combustion engine, there can be gaseous fuel depressurization events that involve both a rapid and large change in gaseous fuel pressure, such as when the engine switches from high load to idle, or when the engine shuts off. In the circumstance when the sealing member has become permeated with high pressure gas, and both the rate and amount of pressure decrease across the sealing member are sufficiently high, the gaseous fuel molecules evacuate the sealing member with such force and velocity that it causes structural damage to the seal member. The damage initially can be almost undetectable, but through repeated cycles of the above described scenario the accumulated structural damage to the sealing member will prevent it from being able to seal gaseous fuel under high pressure.

The state of the art is lacking in techniques for sealing gaseous fuel within fuel systems for internal combustion engines. The present method and apparatus provides a technique for improving the sealing of gaseous fuel between gaseous fuel conduits and between gaseous fuel conduits and fuel injectors in internal combustion engines.

SUMMARY OF THE INVENTION

An improved method for sealing a gaseous fuel between gaseous fuel conduits in an internal combustion engine comprises forming a contact band between two surfaces of a sealing structure between a first conduit and a second conduit. In an exemplary embodiment the surfaces are metal surfaces. A width of the contact band is at least equal to the larger of a minimum contact pressure width where contact pressure is at least equal to a predetermined minimum contact pressure; and a minimum yield zone width where at least one of the two metal surfaces have plastically deformed. The width of the contact band is within a predetermined range of the larger of the minimum contact pressure width and the minimum yield zone width. Either metal surface can be one of a frustoconical surface, a spherical surface, a parabolic surface and a hyperbolic surface. In an exemplary embodiment, one metal surface is spherical and the other metal surface is frustoconical.

The method further comprises selecting the predetermined minimum contact pressure as a function of at least one of gaseous fuel pressure; at least one of the material of the first conduit and the material of the second conduit; and surface finish of at least one of the first conduit and the second conduit around the contact band. In an exemplary embodiment, the predetermined minimum contact pressure is selected as at least equal to four times the gaseous fuel pressure. The method still further comprises selecting the minimum yield zone width as a function of at least one of gaseous fuel pressure; at least one of the material of the first conduit and the material of the second conduit; and surface finish of at least one of the first conduit and the second conduit around the contact band. In an exemplary embodiment, a softer material is selected for the second conduit compared to the first conduit, such that only the first conduit plastically deforms.

In an exemplary embodiment, the second conduit is a fuel line. The method further comprises selecting a wall thickness of the second conduit less than a wall thickness for a liquid fuel line, such as a diesel fuel line. This allows the packaging envelope of a gaseous fuel system to be reduced and/or gaseous fuel flow area in a gaseous fuel line to be increased.

The method further comprises finishing the metal surfaces such that a surface roughness is within a range of 0.06 root mean square and 1.6 root mean square. The surface finish is not required to be super polished to achieve gaseous fuel sealing, and sealing can be achieved with reduced contact pressure when the surface is finished to at least a predetermined level of roughness.

An improved sealing structure for forming a gaseous fuel seal between a first conduit and a second conduit in an internal combustion engine comprises an inwardly tapering section in the first conduit and an end-form at one end of the second conduit. A fitting extends around the inwardly tapering section and is secured to the first conduit. The second conduit extends through a nut that threadedly engages the fitting to secure the end-form to the inwardly tapering section thereby forming a contact band. A width of the contact band is at least equal to the larger of a minimum contact pressure width where contact pressure is at least equal to a predetermined minimum contact pressure; and a minimum yield zone width where at least one of the end-form and the inwardly tapering section have plastically deformed. In an exemplary embodiment, the inwardly tapering section and the end-form are low to medium strength steels, and the minimum contact pressure width and the minimum yield zone width are within a range of 0.5 millimeters and 1 millimeter.

In another exemplary embodiment, the first conduit is one of a gaseous fuel rail and a conduit in a gaseous fuel injector. The first conduit can be one of an elongated tube, a forged component having a fuel passageway, and a molded component having a fuel passageway. The second conduit can be a fuel line. The second conduit can be an elongated tube comprising an outer diameter and an inner diameter, where the outer diameter is less than two times the inner diameter. In an exemplary embodiment, the outer diameter is substantially around 10 millimeters and the inner diameter is substantially around 6 millimeters.

A surface shape of the inwardly tapering section can be one of a frustoconical surface, a spherical surface, a parabolic surface and a hyperbolic surface. A surface shape of the end-form can be one of a frustoconical surface, a spherical surface, a parabolic surface and a hyperbolic surface. In an exemplary embodiment, the surface shape of the inwardly tapering section is frustoconical and the surface shape of the end-form is spherical.

The minimum contact pressure width can be greater than then the minimum yield zone width, or vice versa, and this is dependent on a number of factors, particularly the materials of the conduits. In an exemplary embodiment, the predetermined minimum contact pressure is at least equal to four times gaseous fuel.

DETAILED DESCRIPTION OF PREFERRED EMBODIMENT(S)

Figure 1:
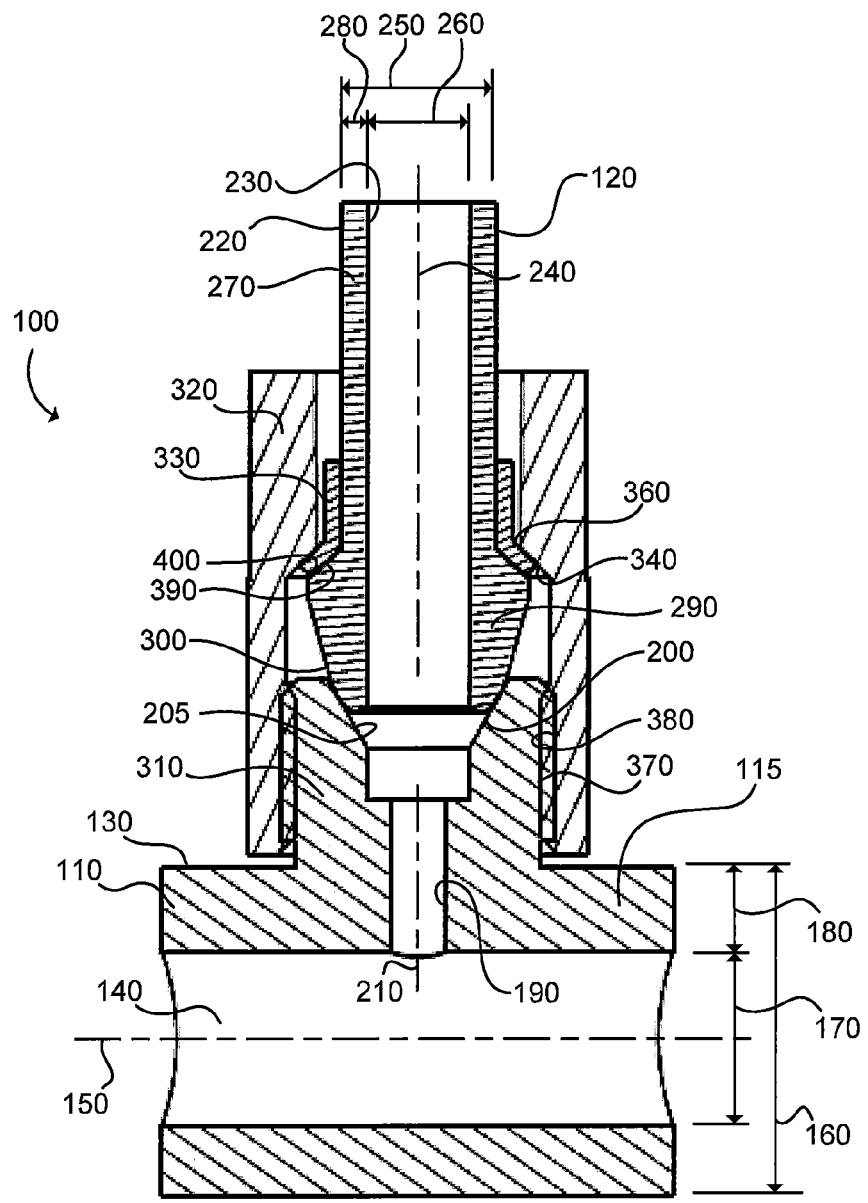
FIG. 1 is a cross-sectional schematic view of a gaseous fuel sealing structure according to a first embodiment.
Figure 2:
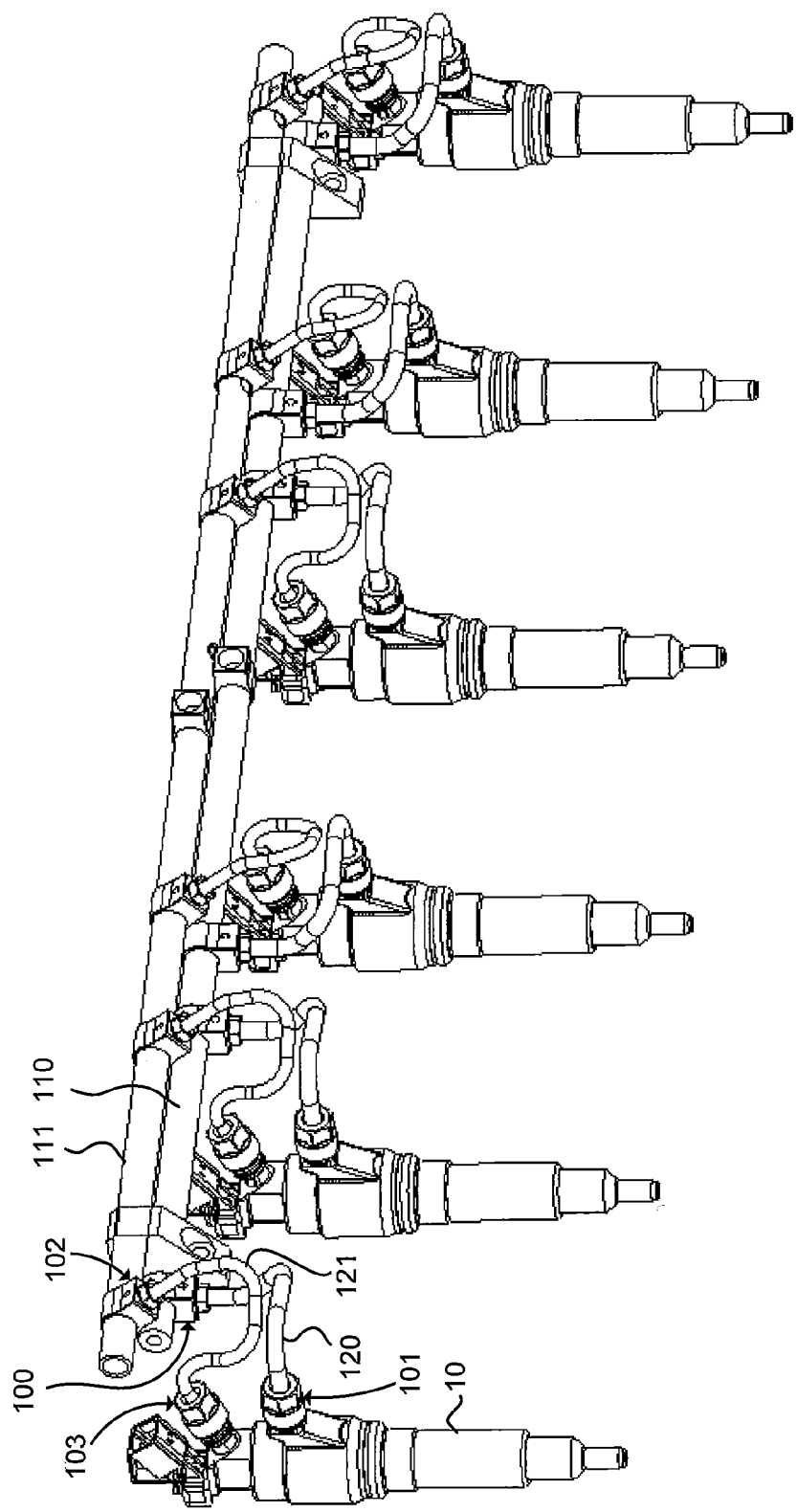
FIG. 2 is an isometric view of a fuel system comprising gaseous fuel injectors connected with a gaseous fuel rail through respective gaseous fuel lines, where gaseous fuel sealing structures like the gaseous fuel sealing structure of FIG. 1 is employed to fluidly seal the gaseous fuel lines to the gaseous fuel rail and the gaseous fuel injectors. In the illustrated embodiment, the gaseous fuel injectors are also liquid fuel injectors that can introduce gaseous fuel and liquid fuel separately and independently into combustion chambers of an internal combustion engine.

Referring to FIGS. 1 and 2, there is shown sealing structure 100 suitable for sealing gaseous fuel at fluid connections between conduits in a fuel system for an internal combustion engine. Sealing structure 100 can be employed for branch connections between gaseous fuel rail 110 and fuel line 120, where the fuel line delivers gaseous fuel from the fuel rail to fuel injector 10 for direct injection into a combustion chamber (not shown) of the internal combustion engine at any time during the compression stroke and into the power stroke of the engine. In the illustrated embodiment of FIG. 2, fuel injector 10 is also in fluid communication with liquid fuel rail 111 through fuel line 121, and can introduce gaseous fuel and liquid fuel (such as diesel) separately and independently into the combustion chamber. Sealing structure 101 (seen in FIG. 2) is employed between fuel line 120 and fuel injector 10, to provide a gas tight connection therebetween, and since sealing structure 101 is similar to sealing structure 100, only a description of sealing structure 100 is described herein. In other embodiments sealing structures 100, 101 can be employed between a gaseous fuel rail and a fuel injector that only introduces a gaseous fuel. Fuel injector 10 can be employed in so called high pressure direction injection (HPDI) internal combustion engines, where the gaseous fuel is introduced late cycle and is a main fuel that provides the majority of power over most of the engine map most of the time, and the liquid fuel (such as diesel) is a pilot fuel that is compression ignited and employed to ignite the gaseous fuel.

With reference to FIG. 1, sealing structure 100 is now described in more detail. In the illustrated embodiment, fuel rail 110 is an elongated tube having longitudinal axis 150 and wall 115 between outer diameter 160 and inner diameter 170. In other embodiments the fuel rail is not required to be an elongated tube and can be a forged or molded component comprising fuel passageways for delivery of one or more fuels where at least one of the fuel passageways delivers a gaseous fuel. Generally, for any fuel rail construction and shape, longitudinal axis 150 can be considered at least a local longitudinal axis of the fuel rail in the region of the seal structure 100. The difference between a radius of outer diameter 160 and a radius of inner diameter 170 defines wall thickness 180. Wall 115 comprises through-bore 190 extending from inwardly tapering section 200 in outer surface 130 to inner surface 140. Axis 210 of through-bore 190 is transverse with respect to longitudinal axis 150 of the fuel rail. In an exemplary embodiment, surface 205 of inwardly tapering section 200 is a frustoconical surface; however, in other embodiments the surface can be a spherical surface, a parabolic surface, an elliptical surface, a hyperbolic surface as well as other types of surface shapes. Fuel rail 110 is made from a metal material, and in particular the material bound by surface 205 is metal.

Fuel line 120 comprises outer surface 220 and inner surface 230. In the illustrated embodiment, fuel line 120 is an elongated tube defined by longitudinal axis 240, in the vicinity of fuel rail 110, and where outer diameter 250 and inner diameter 260 define wall 270. Fuel line 120 provides a fluid connection between fuel rail 110 and the fuel injector, and can be bent into a predefined shape in order to make the connection therebetween, as seen in FIG. 2. The difference between a radius of outer diameter 250 and a radius of inner diameter 260 defines wall thickness 280. Wall thickness 280 is specified based on the designed pressure range for the gaseous fuel and strength properties required for the safe handling of the gaseous fuel in compliance with industry standards and regulations. If the selected gaseous fuel line wall thickness can be less than a diesel fuel line wall thickness, this can provide the advantage of providing either a greater cross-sectional flow area for a common outer diameter, or a reduced outer diameter for a common cross-sectional flow area. Additionally, the formability of fuel line 120 is increased when wall thickness 280 is reduced, which is advantageous when the fuel line needs to bent into a predefined shape, such as those illustrated in FIG. 2. Fuel line 120 further comprises end-form 290 having surface 300 that in the illustrated and preferred embodiment is shaped to cooperate with rail surface 205 into which it is received; however, in other embodiments surface 300 can shaped with other profiles, such as, by way of example, a spherical surface, a frustoconical surface, a parabolic surface, an elliptical surface, and a hyperbolic surface. In the illustrated embodiment, end-form 290 is integral to fuel line 120 and is made from a metal material such as steel.

Annular fitting 310 extends around inwardly tapering section 200 and through-bore 190 and outwardly from outer surface 130, and can be integral or welded to fuel rail 110. In other embodiments fitting 310 can comprise an annular collar that receives fuel rail 110 such that the fitting is moved to the location of through-bore 190 where it is fastened in place to the fuel rail, such as by a set screw, plug or weld. In still further embodiments, when fuel rail 110 is forged, annular fitting 310 can be a boss extending from the surface of the forging. To secure fuel line 120 to fuel rail 110, the fuel line extends through nut 320 and annular sleeve 330, such that the nut threadedly engages annular fitting 310 to transfer compressive force through the sleeve to end-form 290 and onto the fuel rail, thereby forming a gas tight seal between surface 300 of the end-form and surface 205 of inwardly tapering section 200. Contact pressure between surfaces 205 and 300 can be controlled by controlling the torque applied to nut 320 when fastening to fitting 310. As used herein, the expression "gas tight seal" refers to a seal that maintains gaseous fuel leakage across the seal below a predetermined maximum leak rate when gaseous fuel pressure is below a predetermined value. In other embodiments annular sleeve 330 is not required, and in these embodiments nut 320 can directly engage end-form 290. Nut 320 comprises a stepped bore having bearing surface 340, and annular sleeve 330 comprises bearing surface 360 that is mutually engageable with bearing surface 340 of the nut. In the illustrated embodiment, the bearing surfaces 340 and 360 are annular and extend around axis 240. Preferably sleeve 330 is a harder material than end-form 290 to reduce deformation on bearing surface 360 as a result of the tightening of nut 320. The structure of sleeve 330 can vary in other embodiments. External threads 370 along the outer surface of annular fitting 310 are mutually engageable with internal threads 380 along the stepped bore of nut 320. In other embodiments, the threads on annular fitting 310 and nut 320 can be reversed, that is there can be internal threads on the annular fitting and external threads on the nut. As nut 320 threadedly engages annular fitting 310, bearing surface 390 on sleeve 330 mutually engages bearing surface 400 on end-form 290 to transfer compressive force from the nut to the end-form.

Sealing structures similar to sealing structure 100 have been used in diesel fuel systems for internal combustion engines to seal branch connections between high pressure conduits fluidly communicating diesel fuel (a liquid). In these diesel sealing structures, a contact pressure between an end-form of a diesel fuel line (the analogue of end-form 290) and an inwardly tapering section in a diesel fuel rail (the analogue of inwardly tapering section 200) in the range of 1.5 and 2 times the diesel fuel pressure is normally required to form a liquid-tight seal for diesel fuel pressures up to 3000 bar. When this same liquid seal criteria is applied to sealing structure 100, when fuel rail 110 and fuel line 120 fluidly communicate a gaseous fuel, a gas tight seal could not be formed between the fuel rail and the fuel line, where gaseous fuel was found to leak above the predetermined maximum leak rate, for gaseous fuel pressures as low as 300 bar, in the absence of plastic deformation.

Figure 3:
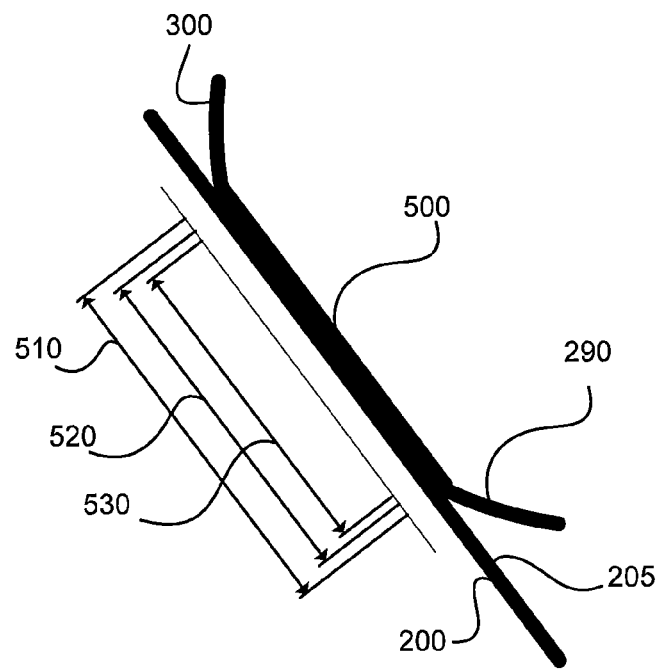
FIG. 3 is a schematic view of a contact band between an end-form and an inwardly tapering section of the sealing structure of FIG. 1, where minimum contact pressure width (the width where contact pressure is at least equal a predetermined minimum contact pressure) is greater than a minimum yield zone width (the width where the contact band has plastically deformed).
Figure 4:
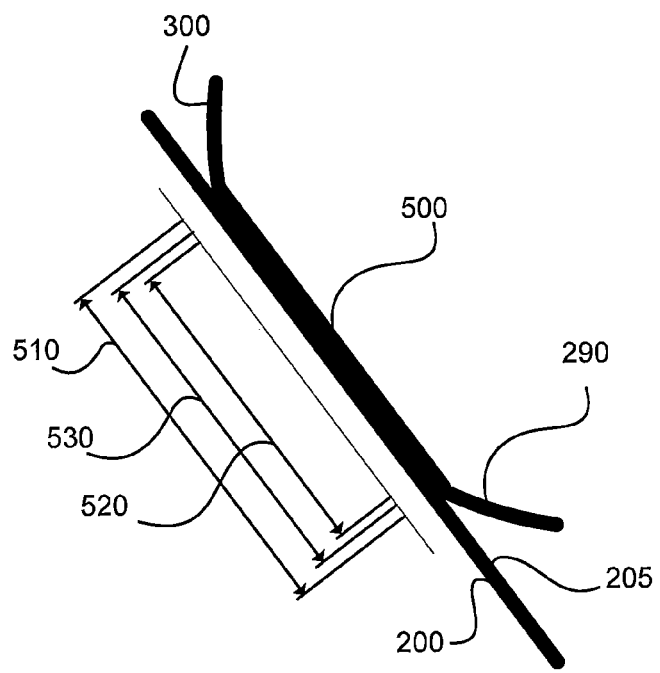
FIG. 4 is a schematic view of a contact band between an end-form and an inwardly tapering section of the sealing structure of FIG. 1, where minimum contact pressure width (the width where contact pressure is at least equal a predetermined minimum contact pressure) is less than a minimum yield zone width (the width where the contact band has plastically deformed).
Figure 5:
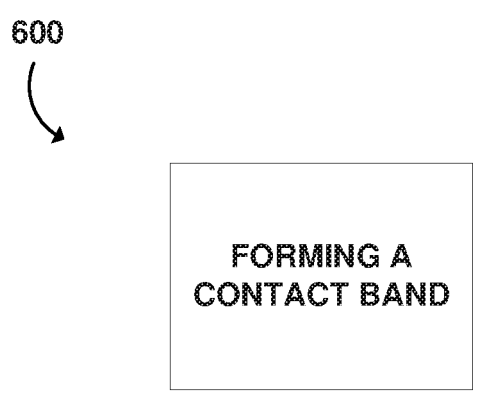
FIG. 5 is a block diagram view of a method 600 of sealing a gaseous fuel at fluid connections in accordance with an embodiment of the present disclosure.

Referring now to FIGS. 3 and 4, the criteria for forming a gas tight seal between end-form 290 and inwardly tapering section 200 will now be described. Contact band 500 is formed between end-form 290 and inwardly tapering section 200 when nut 320 (seen in FIG. 1) is fastened to annular fitting 310, pressing the end-form into the inwardly tapering section. The shape of contact band 500 is determined by the shapes of surface 205 of the inwardly tapering section and of surface 300 of the end-form. In the illustrated embodiment, contact band 500 is annular; in other embodiments contact band 500 can be other shapes, such as an elliptical band. The inventors discovered that specifying a contact pressure alone between surfaces 205 and 300 at contact band 500 is insufficient to ensure a gas tight seal. To form a gas tight seal, width 510 of contact band 500 needs to be at least equal to the larger of (1) minimum contact pressure width 520 where the contract pressure is greater than a predetermined minimum contact pressure, and (2) minimum yield zone width 530 where one of end-form 290 and tapering section 200 have plastically deformed. In the illustrated embodiment of FIG. 3, minimum contact pressure width 520 is greater than minimum yield zone width 530. This is not a requirement and in other embodiments the minimum contact pressure width can be greater than the minimum yield zone width, as illustrated in FIG. 4. Contact band 500 generally comprises a plastic deformation region and one or more elastic deformation regions depending on the shapes and orientation of surfaces 205 and 300 with respect to each other. For example, the plastic deformation region can be straddled on either side by regions of elastic deformation when surface 205 is planar and surface 300 is spherical.

The predetermined minimum contact pressure is a function of the gaseous fuel, and more particularly the characteristic properties of the gas particles that make up the gaseous fuel. In an exemplary embodiment, when the gaseous fuel is methane or natural gas, the predetermined minimum contact pressure is equal to four times the gaseous fuel pressure in fuel rail 110 and fuel line 120 (the applied pressure on the seal). Minimum contact pressure width 520 is a function of the shapes of surfaces 205 and 300. For example, when these surfaces are parallel then minimum contact pressure width 520 is equal to width 510 of contact band 500 when the contact pressure is equal to the predetermined minimum contact pressure. The surface finish (or roughness or degree of asperities) of surface 205 of the inwardly tapering section and surface 300 of the end-form also influences the minimum contact pressure width 520. Surface 205 and surface 300 have a surface finish below a predetermined maximum surface roughness, and in an exemplary embodiment the predetermined maximum surface roughness is 1.6 root mean square.

Plastic deformation is required to fill surface asperities in surfaces 205 and 300 (seen in FIG. 3) at contact band 500 to form a gas tight seal. This is contrast to forming a liquid tight seal in sealing structures 102 and 103 associated with liquid fuel line 121 (seen in FIG. 2), where plastic deformation is not required to form a seal. Preferably only end-form 290 plastically deforms, since fuel line 120 is typically more cost effective to replace than either fuel rail 110 or fuel injector 10, and fuel line 120 may need to be replaced after sealing structure 100 has been assembled and disassembled a predetermined number of times, causing surface fatigue in the vicinity of contact band 500. Minimum yield zone width 530 is a function of the yielded material, which can be the material of end-form 290, fuel rail 110 or fuel injector 10, the finish of surface 205 of the inwardly tapering section and surface 300 of the end-form, and the gaseous fuel pressure in fuel rail 110 and fuel line 120 (the applied pressure on the seal).

In an exemplary embodiment, inwardly tapering section 200 and end-form 290 are made from low to medium strength steels, such as carbon steel, and minimum contact pressure width 520 is in a range of 0.5 and 1 millimeters and minimum yield zone width is in a range of 0.5 and 1 millimeters.

By applying the above two criteria to sealing structures 100 and 101 for sealing gaseous fuel both the reliability and durability of the sealing structure can be increased. That is, if sealing structure 100 is haphazardly employed to seal gaseous fuel, without regard to the above gaseous fuel sealing criteria, and it is found that gaseous fuel is leaking, then those in the art would be inclined to over-torque nut 320, thereby causing excessive plastic deformation in either end-form 290 or inwardly tapering section 200, or both, which decreases the reliability and durability of the sealing structure as it is assembled and disassembled repeatedly, and as it undergoes repetitive vibrational loading from operation of the internal combustion engine, both of which can cause fatigue. Excessive contact pressure in contact band 500 can also overly strain the threaded connection between nut 320 and fitting 310, further reducing the reliability and durability of sealing structure 100. When the gaseous fuel sealing criteria is met, the components in sealing structures 100, 101 will not be overrated and oversized compared to when the criteria is not followed. This allows a reduction in the cost of the sealing structure, and an overall packaging envelope of a gaseous fuel system employing the sealing structure. This is particularly critical for those internal combustion engine applications where the gaseous fuel system is located on the engine under the valve cover, a location that can be crowded with preexisting components. The sealing structure disclosed herein can be used for sealing gaseous fuel conduits in applications other than internal combustion engines.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A sealing structure for forming a gaseous fuel seal between a first conduit and a second conduit in an internal combustion engine comprising:
   an inwardly tapering section in the first conduit, the inwardly tapering section including a surface shape that is one of a frustoconical surface, a spherical surface, a parabolic surface or a hyperbolic surface;
   a fitting extending around the inwardly tapering section and secured to the first conduit;
   a nut;
   an end-form at one end of the second conduit, the end-form including a surface shape that is one of a frustoconical surface, a spherical surface, a parabolic surface or a hyperbolic surface and is different from the surface shape of the inwardly tapering section, the second conduit extending through the nut;
   wherein the nut threadedly engages the fitting to secure the end-form to the inwardly tapering section thereby forming a contact band;
   wherein a width of the contact band is at least equal to the larger of:
   a minimum contact pressure width predetermined by determining the minimum contact pressure width where contact pressure is at least equal to a contact pressure sufficient to form a gas tight seal in the contact band; and
   a minimum yield zone width predetermined by determining a minimum yield zone width where at least one of a surface of the end-form and a surface of the inwardly tapering section have plastically deformed.

2. The sealing structure of claim 1, wherein at least one of the minimum contact pressure width is within a range of 0.5 millimeters to 1 millimeter and the minimum yield zone width is within a range of 0.5 millimeters to 1 millimeter.

3. The sealing structure of claim 1, wherein at least one of the inwardly tapering section is a low to medium strength carbon steel and the end-form is a low to medium strength carbon steel.

4. The sealing structure of claim 1, wherein the first conduit is one of a gaseous fuel rail and a conduit in a gaseous fuel injector.

5. The sealing structure of claim 1, wherein the first conduit is one of an elongated tube, a forged component having a fuel passageway, and a molded component having a fuel passageway.

6. The sealing structure of claim 1, wherein the second conduit is a fuel line.

7. The sealing structure of claim 1, wherein the second conduit is an elongated tube comprising an outer diameter and an inner diameter, wherein the outer diameter is less than two times the inner diameter.

8. The sealing structure of claim 1, wherein the predetermined minimum contact pressure width is greater than then the predetermined minimum yield zone width.

9. The sealing structure of claim 1, wherein the contact pressure is at least equal to four times the gaseous fuel pressure.

10. The sealing structure of claim 1, wherein the inwardly tapering section includes a surface shape that is the frustoconical shape and the end form includes a surface shape that is the spherical shape.

11. A method for sealing a gaseous fuel at fluid connections between gaseous fuel conduits in an internal combustion engine comprising:
    forming a contact band between two surfaces of a sealing structure between a first conduit and a second conduit, one of the two surfaces including a surface shape that is one of a frustoconical surface, a spherical surface, a parabolic surface or a hyperbolic surface and the other of the two surfaces having a surface shape that is different from the surface shape of the one of the two surfaces and is one of a frustoconical surface, a spherical surface, a parabolic surface or a hyperbolic surface;
    determining a minimum contact pressure width where contact pressure is at least equal to a contact pressure sufficient to form a gas tight seal between the two surfaces of the sealing structure; and
    determining a minimum yield zone width where at least one of the two surfaces have plastically deformed;
    wherein a width of the contact band is at least equal to the larger of:
    the determined minimum contact pressure width; and
    the determined minimum yield zone width.

12. The method of claim 1, wherein the width of the contact band is between the larger of the determined minimum contact pressure width and the determined minimum yield zone width.

13. The method of claim 1, further comprising selecting the contact pressure as a function of at least one of:
    gaseous fuel pressure;
    at least one of the material of the first conduit and the material of the second conduit; and
    surface finish of at least one of the first conduit and the second conduit around the contact band.

14. The method of claim 1, further comprising selecting the contact pressure as at least equal to four times the gaseous fuel pressure.

15. The method of claim 1, wherein determining the minimum yield zone width comprises determining the minimum yield zone width as a function of at least one of:
    gaseous fuel pressure;
    at least one of the material of the first conduit and the material of the second conduit; and
    surface finish of at least one of the first conduit and the second conduit around the contact band.

16. The method of claim 11, further comprising selecting a softer material for the second conduit compared to the first conduit.

17. The method of claim 16, further comprising selecting the softer material such that only the second conduit plastically deforms.

18. The method of claim 11, wherein the second conduit is a fuel line, further comprising selecting a wall thickness of the second conduit less than a wall thickness for a liquid fuel line.

19. The method of claim 11, further comprising finishing the surfaces such that a surface roughness is within a range of 0.06 root mean square and 1.6 root mean square.

20. The method of claim 11, wherein the one of the two surfaces includes a surface shape that is the frustoconical shape and the other of the two surfaces includes a surface shape that is the spherical shape.

* * * * *